(12) United States Patent
Qiu et al.

(10) Patent No.: US 10,824,176 B2
(45) Date of Patent: Nov. 3, 2020

(54) THERMOSTATIC VALVE

(71) Applicant: Zhejiang Sanhua Automotive Components Co., Ltd., Zhejiang (CN)

(72) Inventors: Haoming Qiu, Zhejiang (CN); Bin Yin, Zhejiang (CN); Xiaojun Qian, Zhejiang (CN)

(73) Assignee: Zhejiang Sanhua Automotive Components Co., Ltd., Zhejiang (CN)

( * ) Notice: Subject to any disclaimer, the term of this patent is extended or adjusted under 35 U.S.C. 154(b) by 87 days.

(21) Appl. No.: 16/096,239

(22) PCT Filed: Apr. 11, 2017

(86) PCT No.: PCT/CN2017/080042
§ 371 (c)(1),
(2) Date: Oct. 24, 2018

(87) PCT Pub. No.: WO2017/185972
PCT Pub. Date: Nov. 2, 2017

(65) Prior Publication Data
US 2019/0163212 A1    May 30, 2019

(30) Foreign Application Priority Data

Apr. 26, 2016   (CN) .......................... 2016 1 0264898

(51) Int. Cl.
*G05D 23/13*        (2006.01)
(52) U.S. Cl.
CPC ....... *G05D 23/132* (2013.01); *G05D 23/1333* (2013.01)
(58) Field of Classification Search
CPC .... G05D 23/021; G05D 23/13; G05D 23/132; G05D 23/1333; G05D 23/1852
See application file for complete search history.

(56) References Cited

U.S. PATENT DOCUMENTS

2004/0238650 A1   12/2004 Luig et al.
2006/0108435 A1*   5/2006 Kozdras ............. G05D 23/1333
                                                      236/93 R
(Continued)

FOREIGN PATENT DOCUMENTS

CN           1549958 A      11/2004
CN         103573993 A       2/2014
(Continued)

OTHER PUBLICATIONS

Extended European Search Report for European Application No. 17788624.9, dated Nov. 13, 2019.

(Continued)

*Primary Examiner* — Marc E Norman
(74) *Attorney, Agent, or Firm* — Wolf, Greenfield & Sacks, P.C.

(57) ABSTRACT

A thermostatic valve, including: a valve body having a cavity provided therein; an end cover, a thermal actuator and a first spring which are provided in the cavity. The end cover is provided with a first valve seat; the first valve seat is provided with a first valve port; the first valve port is provided opposed to a second port, and the first valve seat encloses an inner end opening of the second port; an outer wall of the first valve seat enclosing the inner end opening of the second port is in clearance fitting with an inner wall of the cavity; an outer wall at an end of the body of the thermal actuator which is near the end cover is in slide fitting with an inner wall of the valve seat; the thermostatic valve opens and closes the first valve port by means of the body of the thermal actuator.

15 Claims, 6 Drawing Sheets

(56) References Cited

U.S. PATENT DOCUMENTS

| | | | |
|---|---|---|---|
| 2007/0164123 A1 | 7/2007 | Willers et al. | |
| 2010/0126594 A1 | 5/2010 | Sheppard | |
| 2015/0185738 A1 | 7/2015 | Qiu et al. | |
| 2015/0204453 A1* | 7/2015 | Qiu .................... | G05D 23/1333 251/11 |
| 2016/0224037 A1* | 8/2016 | Qiu ........................ | F01M 5/007 |
| 2019/0107037 A1* | 4/2019 | Qiu .......................... | F01P 7/16 |

FOREIGN PATENT DOCUMENTS

| | | |
|---|---|---|
| CN | 103574264 A | 2/2014 |
| CN | 205559858 U | 9/2016 |
| CN | 205559961 U | 9/2016 |
| DE | 102007039495 A1 | 2/2009 |
| EP | 2 884 134 A1 | 6/2015 |
| JP | S57-178106 U | 11/1982 |
| JP | H03-114685 U | 11/1991 |
| JP | H03-116985 U | 11/1991 |
| JP | H10227372 A | 8/1998 |
| JP | H11117743 A | 4/1999 |
| JP | 2007-192406 A | 8/2007 |
| WO | WO 2012/052553 A1 | 4/2012 |

OTHER PUBLICATIONS

First Office Action for Chinese Application No. 201610264898.2, dated Mar. 4, 2019.
Office Action for Japanese Application No. 2018-557011, dated Sep. 17, 2019.
International Search Report dated Jul. 12, 2017 in connection with International Application No. PCT/CN2017/080042.

* cited by examiner ent stage filing under 35 U.S.C. § 371 of International Patent Application Serial No. PCT/CN2017/080042, filed Apr. 11, 2017, which claims the priority to Chinese Patent Application No. 201610264898.2, titled "THERMOSTATIC VALVE", filed on Apr. 26, 2016 with the Chinese State Intellectual Property Office. The entire contents of these applications are incorporated herein by reference in their entirety.

THERMOSTATIC VALVE

This application is a national stage filing under 35 U.S.C. § 371 of International Patent Application Serial No. PCT/CN2017/080042, filed Apr. 11, 2017, which claims the priority to Chinese Patent Application No. 201610264898.2, titled "THERMOSTATIC VALVE", filed on Apr. 26, 2016 with the Chinese State Intellectual Property Office. The entire contents of these applications are incorporated herein by reference in their entirety.

FIELD

The present application relates to the field of fluid control, and specifically to a thermostatic valve.

BACKGROUND

During the running of a vehicle, various parts of the vehicle need to be timely lubricated with lubricating oil, to ensure the normal running of the vehicle. For an ordinary vehicle, the lubricating oil directly passes through a cooling device to be regulated, that is, the lubricating oil must pass through the cooling device no matter whether the lubricating oil needs to be regulated or not, which inevitably results in energy waste and runs counter to the trend of energy saving and emission reduction which is strongly advocated currently.

In some high-class vehicles, the temperature of the oil in the gear box is mainly regulated by a cooling flow path formed by a thermostatic valve and a cooling device. However, the conventional thermostatic valves generally have a large volume, occupy a large space and are not easily mounted. It is desired to reduce the size and weight of the thermostatic valve in the context of calling for miniaturization and light weight of the vehicle.

Moreover, since the operating environment of the vehicle is complex, a braking element in a thermostatic valve is easily deviated under the vibration caused by poor road conditions and this a control error may be generated, but in this case, the temperature of the lubricating oil rises sharply and needs to be cooled. Therefore, the stability of thermostatic valve is also a problem to be solved urgently.

SUMMARY

A thermostatic valve that has a small size, a light weight and good stability is provided according to technical solutions of the present application. The thermostatic valve includes a valve body provided with a chamber. The chamber has one open end. In a direction from the open end of the chamber to inside, an end cover, a thermal actuator and a first spring are provided in sequence in the chamber. The valve body is further provided with a first connecting port, a second connecting port and a third connecting port. The first connecting port is in communication with the chamber. A mounting cavity is provided in the end cover. The end cover is provided with a first valve seat. The first valve seat is provided with a first valve port. The first valve port faces the second connecting port, and the first valve seat encloses an inner port of the second connecting port close to the chamber. An otter wall of a portion of the first valve seat enclosing the inner port of the second connecting port is in clearance fit with an inner wall of the chamber. The thermal actuator includes a thermal actuator body. An outer wall of an end of the thermal actuator body close to the end cover is in sliding fit with an inner all of the valve seat. The first valve port is opened or closed by the thermal actuator body of the thermostatic valve. The second connecting port is not in communication with the first connecting port when the first valve port is closed by the thermal actuator body. The first connecting port is in communication with the second connecting port via the first valve port when the first valve port is opened by the thermal actuator body.

DETAILED DESCRIPTION OF EMBODIMENTS

Figure 1:
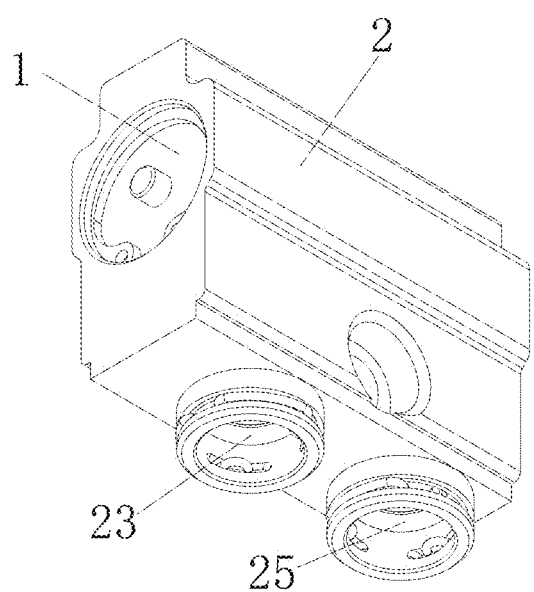
FIG. 1 is a schematic perspective view of a thermostatic valve according to an embodiment of the present application.

An initial deformation force described in this specification refers to a pressure subjected by an elastic element, which is in a compressed condition when not being employed, when the elastic element is subjected to an external force and intends to deform.

The technical solutions are illustrated in detail with reference to the drawings and specific embodiments, and the locality terms such as "top", "bottom", "left" and "right" described in this specification are all set forth according to the respective locality relationships in the drawings.

A thermostatic valve according to an embodiment of the present application is shown in FIG. 1 to FIG. 7. The thermostatic valve includes a valve body 2 in which a chamber 21 is provided, and a thermal actuator 3 mounted in the chamber 21. The chamber 21 has one open end, and the thermal actuator 3 is inserted into the chamber 21 through the open end 22 of the chamber 21. The valve body 2 is further provided with a first connecting port 23, a second connecting port 24, a third connecting port 27 and a fourth connecting port 28 which are in communication with outside. The first connecting port 23, the second connecting port 24, the third connecting port 27 and the fourth connecting port 28 are all in communication with the chamber 21.

It should be noted that the third connecting port 27 and the fourth connecting port 28 may be merged into one connecting port. That is, only the third connecting port may be provided. In this embodiment, the third connecting port and the fourth connecting port are provided to facilitate the connecting and mounting of pipelines of the thermostatic valve.

The chamber 21 herein refers to a chamber formed by drilling a series of holes in the valve body 2, and parts may be arranged and mounted in this chamber.

The thermal actuator 3 includes a thermal actuator body 31, a valve rod 36, and a heat sensitive substance filled in the thermal actuator body. The thermal actuator body 31 includes a first otter wall portion 311 and an annular end portion 312. The annular end portion 312 is located at an end of the thermal actuator body 31 close to the valve rod 36, and the first outer wall portion 311 is located at an end of the thermal actuator body 31 close to the annular end portion 312. The volume of the heat sensitive substance may change with the temperature, such that the valve rod 36 is subjected to a force, which can urge the thermal actuator body 31 to move relative to the valve rod 36 or urge the valve rod to move relative to the thermal actuator body 31.

An end cover 1 is mounted at the open end 22 of the chamber 21, and at least a part of the end cover 1 is extended to the chamber 21 through the open end 22. A sealing ring may be provided between the end cover 1 and an inner wall of the chamber 21 for sealing. The end cover 1 may be secured by a retaining ring.

The end cover 1 includes an end cover main body 11, a incomplete portion 12 and a connecting portion 13. The connecting portion 13 is located between the end cover main body 11 and the incomplete portion 12. The connecting portion 13 connects the end cover main body 11 and the incomplete portion 12 and allows a distance H1 to be kept between a lower end surface of the end cover main body 11 and an upper end surface of the incomplete portion 12.

A mounting cavity 113 is provided in the end cover main body 11. An outer wall of the end cover main body 11 may further be provided with a groove 112 for accommodating the sealing ring.

The connecting portion 13 at least includes a first connecting portion and a second connecting portion. In the present embodiment, both the first connecting portion and the second connecting portion are of columnar-like structures. Outer wall surfaces of the first connecting portion and the second connecting portion are arc-shaped curved surfaces, and inner wall surfaces of the first connecting portion and the second connecting portion are also arc-shaped curved surfaces. The inner wall surfaces of the first connecting portion and the second connecting portion define a second fitting portion 131. Of course, the first connecting portion and the second connecting portion may also be of other structures. For example, side wall surfaces of the first connecting portion and the second connecting portion may be arc-shaped surfaces or irregular concave-convex surfaces. The maximum distance between the outer wall of the first connecting portion and the outer wall of the second connecting portion is greater than an inner diameter of an inner port of the second connecting port.

A wall thickness of the connecting portion 13 is less than a wall thickness of the end cover main body 11, so that a third fitting portion 111 is formed at a portion of a lower bottom surface of the end cover main body 11 close to the mounting cavity 113. The third fitting portion 111 may be of an annular structure.

The incomplete portion 12 has a flat annular structure with a gap, and has a certain thickness. An end of the first connecting portion and an end of the second connecting portion are respectively connected to an upper end surface of the incomplete portion 12. An inner side surface of the incomplete portion 12 is an arc-shaped surface, and a first fitting portion 121 is formed by a portion of the inner side surface of the incomplete portion 12 between the first connecting portion and the second connecting portion. In the present embodiment, two end portions of the incomplete portion 12 are respectively connected to the first connecting portion and the second connecting portion, so that a side wall of the first connecting portion close to the incomplete portion 12, a side wall of the second connecting portion close to the incomplete portion 12, a portion of a lower end portion of the end cover main body 11 close to the incomplete portion 12, and a portion between the first and second connecting portions located at the upper end of the incomplete portion 12 together form a first valve seat. A first valve port 14 is in communication with the second connecting port through a channel formed between the side wall of the first connecting portion close to the incomplete portion 12 and the side wall of the second connecting portion close to the incomplete portion 12 along a direction of the upper end surface of the incomplete portion 12. The first valve port 14 is located at the first valve seat. Of course, the first valve seat may also be arranged on both the connecting portion and the incomplete portion, and the first valve port may also be arranged only on the connecting portion. Therefore, the first valve seat needs to meet a condition that the first valve seat encloses the inner port of the second connecting port close to the chamber. An outer wall of the first valve seat enclosing the inner port of the second connecting port is in clearance fit with the inner wall of the chamber. A flow channel is formed between the outer wall of the first valve seat facing the first connecting port and the inner wall of the chamber. The flow channel is in communication with the first connecting port.

In addition, an outer diameter of the end cover main body 11, an outer diameter of the connecting portion 13 and an outer diameter of the incomplete portion 12 are the same, or outer walls of the end cover main body 11, the connecting portion 12, and the incomplete portion 13 are formed by a same blank as described in the present embodiment.

Figure 2:
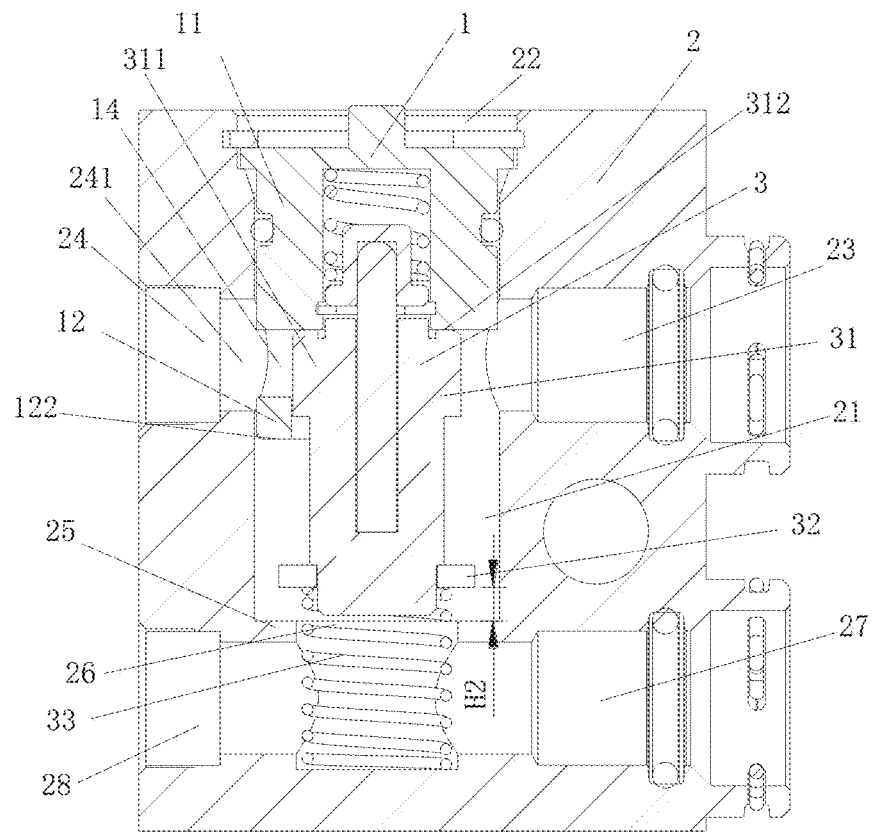
FIG. 2 is a schematic sectional view of the thermostatic valve in FIG. 1.
Figure 3:
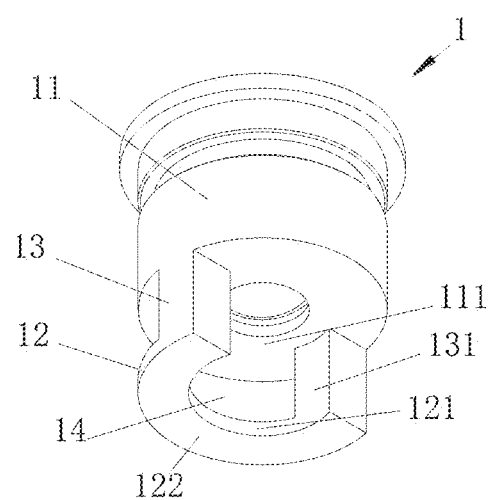
FIG. 3 is a schematic perspective view of an end cover of the thermostatic valve in FIG. 1.
Figure 4:
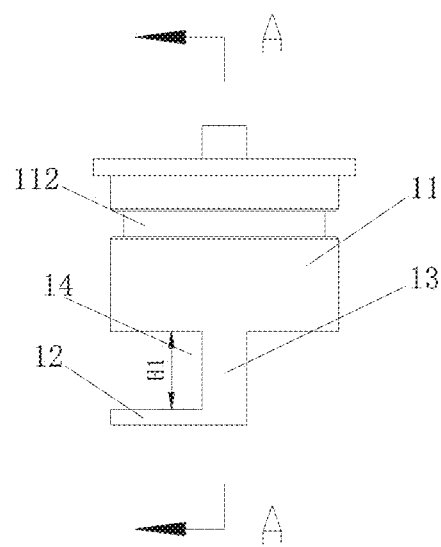
FIG. 4 is a schematic front view of the end cover in FIG. 3.
Figure 5:
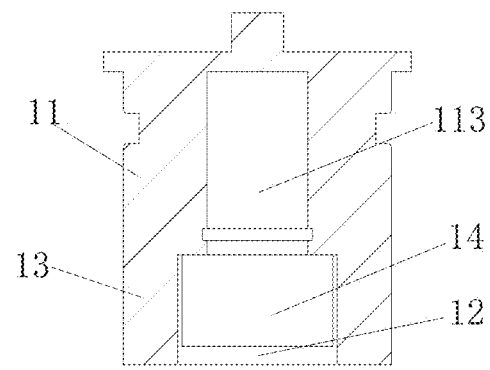
FIG. 5 is a schematic sectional view taken along line A-A n FIG. 4.

As shown in FIG. 2, one end of the valve rod 36 of the thermal actuator may extend into the mounting cavity 113. In a direction from the open end of the mounting cavity 113 to inside, a retaining ring, a spring seat 35 and a second spring 34 are provided in sequence in the mounting cavity 113. The spring seat 35 has a cap-like structure, and an end portion of a portion of the valve rod 36 extending into the mounting cavity 113 is located in an inner chamber of the spring seat. One end of the second spring 34 abuts against a bottom of the mounting cavity 113, the other end of the second spring 34 abuts against the spring seat, and the second spring 34 is in a compressed state.

The chamber 21 includes a first chamber close to the end cover 1 and a second chamber close to a first spring 33. An inner diameter of the first chamber is greater than the inner diameter of the second chamber. A second valve port 26 that is in communication with the third connecting port and the fourth connecting port, is provided between the first chamber and the second chamber, so that a stepped annular valve seat 25 is formed between the first chamber and the second chamber.

In a direction from the open end of the chamber 21 to inside, the end cover 1, the thermal actuator 3 and the first spring 33 are arranged in sequence in the chamber 21. An initial elastic deformation force of the second spring 34 is greater than the maximum deformation force of the first spring 33. The space between the end cover 1 and the valve body 2 is sealed by a sealing ring, and the end cover 1 is secured in the chamber 21 by a retaining ring. The outer wall of the main body 11 of the end cover 1 is in clearance fit with the inner wall of the first chamber of the chamber 21, the outer wall of the connecting portion 13 is in clearance fit with the inner wall of the first chamber of the chamber 21, and the incomplete portion 12 is in clearance fit with the inner wall of the first chamber of the chamber 21. It should be noted that the clearance in the clearance fit is not large, such that an oil sealing can be formed in the clearance when lubricating oil flows into the thermostatic valve.

Figure 6:
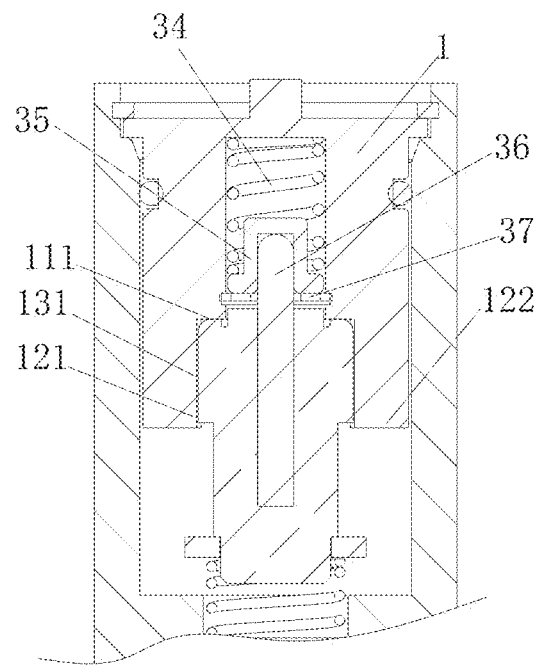
FIG. 6 is a partial sectional view of the thermostatic valve shown in FIG. 1 when a first valve port is closed and a second valve port is open.
Figure 7:
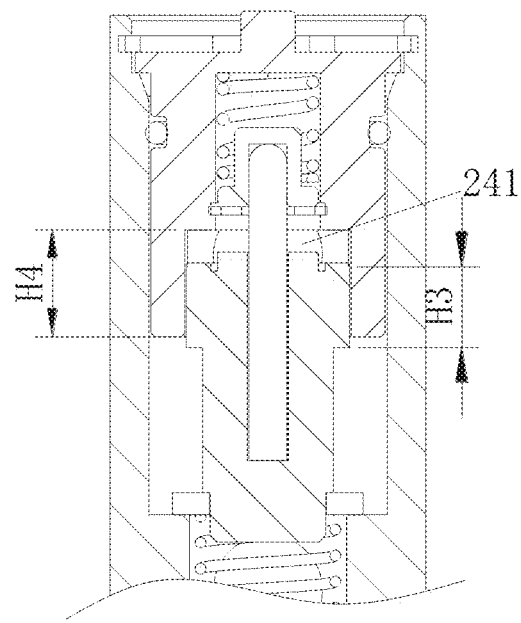
FIG. 7 is a partial sectional view of the thermostatic valve shown in FIG. 1 when a first valve port is open and a second valve port is closed.

As shown in FIG. 2, FIG. 6 and FIG. 7, the first valve port 14 corresponds to an inner port 241 of the second connecting port 24 close to the chamber 21. A lower end surface 122 of the incomplete portion 12 is located below the inner port 241 of the second connecting port. The first valve seat encloses the inner port 241 of the second connecting port, and the second connecting port 24 may be in communication with the chamber 21 through the first valve port 14.

One end of the thermal actuator 3 abuts against the end cover 1 via the valve rod 36, and the other end of the thermal actuator 3 abuts against the first spring 33 via a baffle 32 fixedly sleeved on an end portion of the thermal actuator body 31. An inner diameter of the second valve port 26 is less than an outer diameter of the baffle 32 and is greater than an outer diameter of the thermal actuator body abutting against the first spring 33, so that the baffle 32 and the thermal actuator body 31 may cover and close the second valve port. One end of the first spring 33 abuts against the baffle 32, and the other end of the first spring 33 passes through the second valve port 26 to abut against a bottom of the second chamber. It should be noted that, the first spring 33 may abut against the end portion of the thermal actuator body 31, and an abutment portion abutting against the first spring 33 may be formed on the end portion of the thermal actuator body 31. In the present embodiment, the baffle 32 is additionally provided, so that the thermal actuator body can be easily manufactured at a low cost.

As shown in the drawings, the second valve port 26 is opened or closed by moving the baffle 32 at the end of the thermal actuator body 31 and the thermal actuator body 31 close to or away from the annular valve seat 25. A distance of the baffle 32 moving close to or away from the annular valve seat 25 is indicated by H2.

The first outer wall portion 311 at the other end of the thermal actuator body 31 may be respectively in sliding fit with the first fitting portion 121 and the second fitting portion 131. It should be noted that the sliding fit herein means that there is a clearance but the clearance is not large, and the oil sealing is formed in the clearance when the lubricating oil flows into the thermostatic valve.

As shown in FIG. 6, the second valve port 26 is open in a normal state. The first outer wall portion 311 of the thermal actuator body 31 is fitted with the first fitting portion 121 and the second fitting portion 131, and the annular end portion 312 of the thermal actuator body 31 abuts against the third fitting portion 111, so that the first valve port is closed, and the first connecting port 23 is in communication with the third connecting port 27 via the second valve port 26. It should be noted herein that, the thermal actuator body 31 may be extended into the mounting cavity, and the thermal actuator body 31 may be in clearance fit with the inner wall of the mounting cavity, and in this case, the first valve port is closed.

As shown in FIG. 7, in a case that the temperature of the fluid flowing from the first connecting port 23 into the chamber 21 is higher than a preset temperature, the heat sensitive substance in the thermal actuator 3 expands due to being heated, and under the action force of the valve rod 36, the thermal actuator body 31 compresses the first spring 33 downward until the second valve port 26 is closed. In this case, the first outer wall portion 311 slides towards the second valve port 26 along the first fitting portion 121 and the second fitting portion 131, and the annular end portion 312 is separated from the third fitting portion 111, so that the first valve port 14 is opened, and the first connecting port 23 is in communication with the second connecting port 24 through the first valve port 14.

In a case that the temperature of the fluid still rises after the second valve port 26 is closed, the valve rod 36 may move upwards and compress the first spring 33 because the initial elastic deformation force of the second spring 34 is greater than the maximum deformation force of the first spring 33, thus counteracting the force generated by the expansion of the heat sensitive substance, and preventing the thermal actuator from being damaged.

It should be noted that, the outer diameter of the first outer wall portion 311 may be equal to outer diameters of other outer walls of the thermal actuator body or the outer diameter of the first outer wall portion 311 may be greater than the outer diameters of other outer walls of the thermal actuator body as described in the present embodiment. With the arrangement in the present embodiment, the thermal actuator body has a small volume and a low cost, and the arrangement may also be suitable for arranging internal components of the thermal actuator. In the case that the outer diameter of the first outer wall portion 311 is greater than the outer diameters of other outer walls of the thermal actuator body, a height H3 of the first outer wall portion 311 should be greater than the distance H1 between the lower end surface of the end cover main body 11 and the upper end surface of the incomplete portion 12, to ensure that the first outer wall portion 311 is fitted with the first fitting portion 121 and the second fitting portion 131, and the annular end portion 312 is fitted with the third fitting portion 111 in order to close the first valve port 14. For ensuring that at least a part of the first outer wall portion 311 is always fitted with the first fitting portion 121, a distance H4 between the lower end surface of the end cover main body 11 and the lower end surface of the incomplete portion 12 should be greater than the distance H2 of the baffle 32 moving close to or away from the annular valve seat 25, so that the first fitting portion 121 and the second fitting portion 131 may have a guiding function, thus the thermal actuator 3 is prevented from deviating, the deviating may result in failure of the thermal actuator and a degraded control accuracy, and also a part of the impulse on the thermal actuator body 31 by the fluid flowing from the first connecting port 23 into the chamber 21 can be counteracted, which can further increase the stability of the thermal actuator.

Moreover, the first valve port 14 and the second connecting port 24 face each other, so the first connecting port 23 and the second connecting port 24 may be located at the same height and the first connecting port and the second connecting port do not need to be arranged in a staggered manner to form a valve port between the first connecting port and the second connecting port, which reduces the height of the valve body 2, miniaturizes the thermostatic valve, and saves the cost and installation space.

Figure 8:
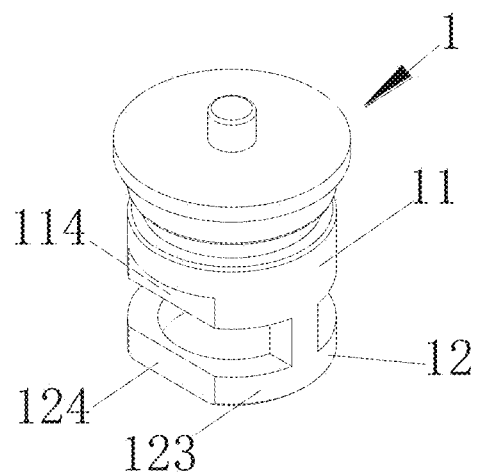
FIG. 8 is a schematic perspective view of an end cover of a thermostatic valve according to another embodiment of the present application.
Figure 9:
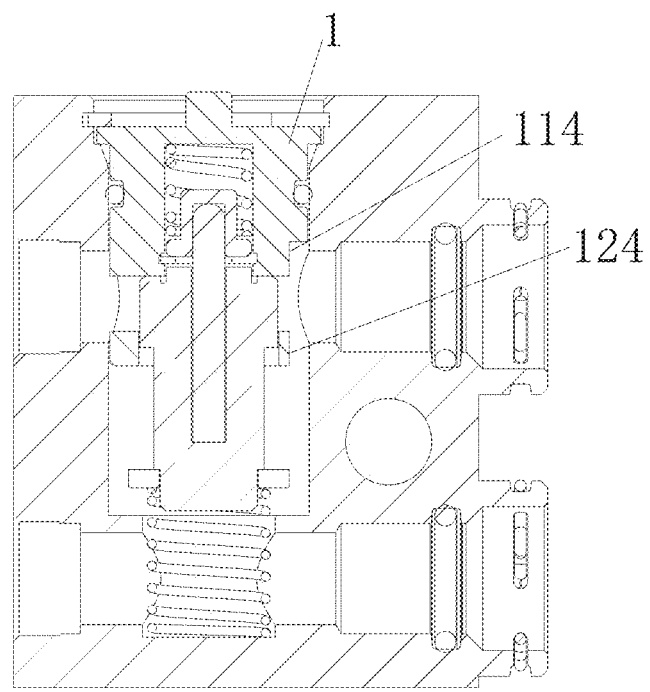
FIG. 9 is a schematic sectional view of the thermostatic valve in FIG. 8.

FIG. 8 and FIG. 9 show another embodiment of the present application, in which the incomplete portion 12 further includes an outer extending portion 123 and a first gap portion 124. The first gap portion 124 is a gap formed by cutting a part from a ring. The incomplete portion 12 may have a closed structure or an open structure. When the first gap portion 124 faces the first connecting port, a flow channel may be formed between the first gap portion 124 and the inner wall of the chamber 21, and the fluid flowing from the first connecting port 23 may flow to the second valve port 26 via the flow channel between the first gap portion 124 and the chamber 21.

In order to further reduce the pressure drop loss of the fluid, a second gap portion 114 is further provided at a portion of the end cover main body 11 corresponding to the first gap portion 124.

In the present embodiment, the contact area between the first outer wall portion 311 and the incomplete portion 12 can be further increased, and the stability of the thermal actuator 3 can be further improved, thereby preventing the thermal actuator 3 from being shifted due to vibration or impact of the fluid.

Other structures in the present embodiment are the same as or similar to those in the above-described embodiments, which are not repeated herein.

Figure 10:
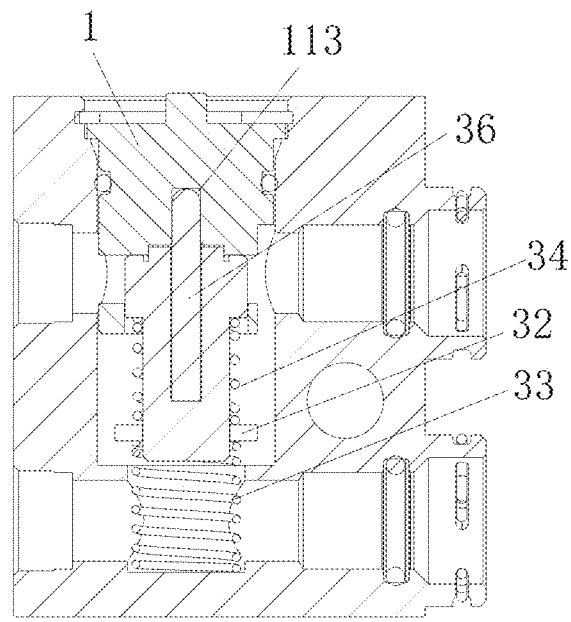
FIG. 10 is a schematic sectional view of a thermostatic valve according to yet another embodiment of the present application.

FIG. 10 shows another embodiment of the present application, in which the mounting cavity 113 in the end cover main body 11 is directly fitted with the valve rod 36, such that one end of the valve rod 36 is secured in the mounting cavity 113. Further, one end of the first spring 33 is secured at the end portion of the thermal actuator body 31, rather than abutting against the baffle 32. The second spring 34 is sleeved on the thermal actuator body 31. One end of the second spring 34 abuts against an end of the first outer wall portion 311, and the other end of the second spring 34 abuts against the baffle 32. The baffle 32 is also sleeved on the thermal actuator body 31, and may slide up and down along the outer wall of the thermal actuator body. In the case that the temperature of the fluid still rises after the second valve port 26 is closed, the thermal actuator 3 moves downwards to further compress the first spring 33, and the baffle 32 slides along the thermal actuator body to compress the second spring 34.

Moreover, the inner diameter of the second valve port 26 is greater than the outer diameter of a portion of the thermal actuator body 31 extendable into the second valve port 26. In the case that the second valve port is closed, at least a part of the lower end surface of the baffle 32 is in communication with the third connecting port 27. In the present embodiment, in order to increase the contact area between the lower end surface of the baffle 32 and the third connecting port 27, an annular region is formed on the lower end surface of the baffle 32 to contact with the third connecting port 27.

When the second valve port 26 is closed and the third connecting port 27 serves as an inlet, if the flow path of lubricating oil from the fourth connecting port to the second connecting port is blocked, the lubricating oil cannot be returned, which may result in lack of oil and thus the damage of a gear box.

Since at least a part of the lower end surface of the baffle 32 is in communication with the third connecting port 27, in the case that the flow path of the lubricating oil from the fourth connecting port to the second connecting port is blocked, the fluid pressure increases, and thus the force applied to the lower end surface of the baffle 32 increases. When the pressure applied on the lower end surface of the baffle 32 is greater than the initial deformation force of the second spring 34, the second valve port 26 is opened, so that the lubricating oil flows back to the gear box through the second valve port 26 and the first connecting port 23.

Other structures in the present embodiment are the same as or similar to those in the above-described embodiments, which are not repeated herein.

Figure 11:
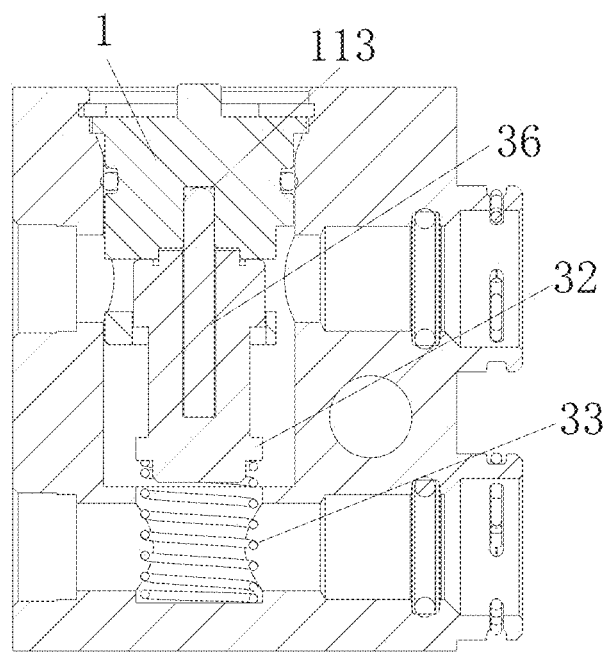
FIG. 11 is a schematic sectional view of a thermostatic valve according to yet another embodiment of the present application.

FIG. 11 shows another embodiment of the present application, in which the mounting cavity 113 in the end cover main body 11 is directly fitted with the valve rod 36, such that an end of the valve rod 36 is secured in the mounting cavity 113. Further, the second spring is not provided. The baffle 32 is integrally formed with the thermal actuator body 31, and the outer wall of the baffle 32 is in sliding fit with the inner wall of the second valve port 26. When the second valve port is closed, the baffle 32 may go deep into the second valve port 26 and nay slide up and down along the inner wall of the second valve port 26.

Other structures in the present embodiment are the same as or similar to those in the above-described embodiments, which are not repeated herein.

The foregoing shows merely specific embodiments of the present application, and is not intended to limit the present application in any form. The locality terms such as "top", "bottom", "left" and "right" described in this specification are all described according to the drawings, and are not intend to limit to the orientations. Although the technical solution has been disclosed by preferred embodiments, the preferred embodiments are not intended to limit the present application. Those skilled in the art may make various possible changes, modifications and equivalent substitutions to the technical solutions of the present application using the above disclosed technical content without departing from the scope of the technical solution of the present application. Therefore, any simple modifications, equivalent substitutions and modifications made to the above embodiments based on the technical essence of the present application without departing from the content in the technical solutions of the present application fall within the protection scope of the technical solutions of the present application.

The invention claimed is:

1. A thermostatic valve, comprising a valve body provided with a chamber, wherein the chamber has one open end, and in a direction from the open end of the chamber to inside, an end cover, a thermal actuator and a first spring are provided in sequence in the chamber; wherein the valve body is further provided with a first connecting port, a second connecting port, and a third connecting port, and the first connecting port is in communication with the chamber;

a mounting cavity is provided in the end cover, wherein the end cover is provided with a first valve seat, the end cover comprises an end cover main body; an incomplete portion; and a connecting portion, the first valve seat is arranged on both the connecting portion, and the incomplete portion, and the first valve port is arranged on the connecting portion, the incomplete portion has a flat annular structure with a gap, and the connecting portion is used for connecting the end cover main body and the incomplete portion, and the first valve seat is provided with a first valve port, the first valve port is located in face of the second connecting port, and an inner port of the second connecting port the chamber is enclosed by the first valve seat, the inner port of the second connecting port is located towards the chamber, and an outer wall of a portion of the first valve seat enclosing the inner port of the second connecting port is in clearance fit with an inner wall of the chamber;

the thermal actuator comprises a thermal actuator body, and an outer wall of an end of the thermal actuator body close to the end cover is in sliding fit with an inner wall of the valve seat; and the first valve port is opened or closed by the thermal actuator body of the thermostatic valve, the second connecting port is not in communication with the first connecting port when the first valve port is closed by the thermal actuator body, and the first connecting port is in communication with the second connecting port via the first valve port when the first valve port is opened by the thermal actuator body, wherein the end cover comprises:
the end cover main body;
the incomplete portion; and
the connecting portion, wherein a first fitting portion and a second fitting portion are formed by inner walls of the incomplete portion and the connecting portion, respectively;

the connecting portion at least comprises a first connecting portion and a second connecting portion, the first valve seat comprises a portion of a lower end portion of the end cover main body corresponding to an upper end surface of the incomplete portion, side wall portions of the first connecting portion and the second connecting portion, and an upper end portion of the incomplete portion, wherein the first valve port is in communication with the second connecting port through a channel enclosed by the lower end surface of the end cover main body corresponding to the incomplete portion, the side walls of the first connecting portion and the second connecting portion and the upper end surface of the incomplete portion; and the end of the thermal actuator body close to the end cover is in sliding fit with the first fitting portion and the second fitting portion.

2. The thermostatic valve according to claim 1, wherein the first valve port is closed and the second connecting port is not in communication with the first connecting port when the thermal actuator body abuts against the end cover or the thermal actuator body extends into the mounting cavity, and the first valve port is opened and the first connecting port is in communication with the second connecting port via the first valve port when an end portion of the thermal actuator body moves away from the end cover main body.

3. The thermostatic valve according to claim 2, wherein a wall thickness of the connecting portion is smaller than a wall thickness of the end cover main body, a third fitting portion is formed by a portion of the lower end surface of the end cover main body close to the mounting cavity, and the first valve port is closed when the thermal actuator body abuts against the third fitting portion, and the first valve port is opened when the end portion of the thermal actuator body moves away from the third fitting portion.

4. The thermostatic valve according to claim 3, wherein the thermal actuator body comprises a first outer wall portion and an end portion which is annular or irregular-shaped, the annular or irregular-shaped end portion is close to the end cover, and the first outer wall portion is close to the annular or irregular-shaped end portion, an outer wall of the first outer wall portion is fitted with inner walls of the first fitting portion and the second fitting portion, and the first outer wall portion is in sliding fit with the first fitting portion and the second fitting portion, and the annular or irregular-shaped end portion abuts against the third fitting portion when the first valve port is closed.

5. The thermostatic valve according to claim 4, wherein a height of the first outer wall portion is greater than a distance between the lower end surface of the end cover main body and the upper end surface of the incomplete portion, a lower end surface of the incomplete portion is located below the inner port of the second connecting port, a maximum distance between the outer wall of the first connecting portion and the outer wall of the second connecting portion is greater than an inner diameter of the inner port of the second connecting port, and the outer wall of the first connecting portion and the outer wall of the second connecting portion are respectively in clearance fit with the inner wall of the chamber.

6. The thermostatic valve according to claim 5, wherein the incomplete portion has a flat structure with a first gap, and the incomplete portion is of a closed structure or an open structure, the lower end surface of the incomplete portion is located below an end opening of the second connecting port close to the chamber, and an end of the first connecting portion and an end of the second connecting portion are respectively connected to the upper end surface of the incomplete portion; and an inner side surface of the incomplete portion is an arc-shaped curved surface, and the first fitting portion is formed by a portion of the inner side surface of the incomplete portion between the first connecting portion and the second connecting portion.

7. The thermostatic valve according to claim 6, wherein two end portions of the incomplete portion are respectively connected to the first connecting portion and the second connecting portion, and the first valve port is formed between a side wall of the first connecting portion and a side wall of the second connecting portion along a direction of the upper end surface of the incomplete portion.

8. The thermostatic valve according to claim 3, wherein an end of the valve rod of the thermal actuator extends into the mounting cavity, and in a direction from the open end of the mounting cavity to inside, a retaining ring, a spring seat and a second spring are provided in sequence in the mounting cavity;

the spring seat has a cap-like structure, and an end portion of a portion of the valve rod extending into the mounting cavity is located in an inner chamber of the spring seat; and one end of the second spring abuts against a bottom of the mounting cavity, and another end of the second spring abuts against the spring seat, the second spring is in a compressed state, and an initial elastic deformation force of the second spring is larger than a maximum deformation force of the first spring.

9. The thermostatic valve according to claim 8, wherein the first connecting port is opposite to the second connecting port, and a second gap portion is provided at a part of the end cover main body corresponding to the first gap.

10. The thermostatic valve according to claim 2, wherein the incomplete portion has a flat structure with a first gap, and the incomplete portion is of a closed structure or an open structure, the lower end surface of the incomplete portion is located below an end opening of the second connecting port close to the chamber, and an end of the first connecting portion and an end of the second connecting portion are respectively connected to the upper end surface of the incomplete portion; and an inner side surface of the incomplete portion is an arc-shaped curved surface, and the first fitting portion is formed by a portion of the inner side surface of the incomplete portion between the first connecting portion and the second connecting portion.

11. The thermostatic valve according to claim 10, wherein two end portions of the incomplete portion are respectively connected to the first connecting portion and the second connecting portion, and the first valve port is formed between a side wall of the first connecting portion and a side wall of the second connecting portion along a direction of the upper end surface of the incomplete portion.

12. The thermostatic valve according to claim 11, wherein the incomplete portion is of a closed annular structure, the first gap faces the first connecting port, a flow channel is formed between the first gap portion and the inner wall of the chamber, and the first connecting port is in communication with the flow channel.

13. The thermostatic valve according to claim 12, wherein the thermal actuator comprises a valve rod and a baffle located at an end portion of the thermal actuator body, wherein an outer diameter of the baffle is greater than an outer diameter of a portion of the thermal actuator body adjacent to the baffle;

the chamber comprises a first chamber close to the end cover and a second chamber for accommodating the first spring;

an inner diameter of the first chamber is greater than an inner diameter of the second chamber, wherein a valve port in communication with the third connecting port is formed between the first chamber and the second chamber, and a stepped annular valve seat is formed between the first chamber and the second chamber, one end of the first spring abuts against the baffle, and another end of the first spring abuts against a bottom of the second chamber; and an outer wall of the baffle is in sliding fit with an inner wall of the valve port, wherein the baffle extends into the valve port by sliding up and down along the inner wall of the valve port when the valve port is closed.

14. The thermostatic valve according to claim 12, wherein the thermal actuator further comprises a valve rod and a baffle sleeved on an end of the thermal actuator body away from the end cover;

the chamber comprises a first chamber close to the end cover and a second chamber for accommodating the first spring;

an inner diameter of the first chamber is greater than an inner diameter of the second chamber, a second valve port in communication with the third connecting port is formed between the first chamber and the second chamber, and a stepped annular valve seat is formed between the first chamber and the second chamber, one end of the first spring abuts against the baffle, and another end of the first spring abuts against a bottom of the second chamber; and an inner diameter of the second valve port is smaller than an outer diameter of the baffle, the second valve port is opened or closed by moving the baffle and the thermal actuator body close to or away from the annular valve seat, and a distance of the baffle moving close to or away from the annular valve seat is smaller than a distance between the lower end surface of the end cover main body and the lower end surface of the incomplete portion.

15. The thermostatic valve according to claim 2, wherein the thermal actuator further comprises a valve rod and a baffle sleeved on an end of the thermal actuator body away from the end cover;

the chamber comprises a first chamber close to the end cover and a second chamber for accommodating the first spring;

an inner diameter of the first chamber is greater than an inner diameter of the second chamber, a second valve port in communication with the third connecting port is formed between the first chamber and the second chamber, and a stepped annular valve seat is formed between the first chamber and the second chamber, one end of the first spring abuts against the baffle, and another end of the first spring abuts against a bottom of the second chamber; and an inner diameter of the second valve port is smaller than an outer diameter of the baffle, the second valve port is opened or closed by moving the baffle and the thermal actuator body close to or away from the annular valve seat, and a distance of the baffle moving close to or away from the annular valve seat is smaller than a distance between the lower end surface of the end cover main body and the lower end surface of the incomplete portion.

* * * * *